United States Patent [19]
Nolting et al.

[11] Patent Number: 5,252,898
[45] Date of Patent: Oct. 12, 1993

[54] METHOD OF OPERATING A WINDSHIELD WIPER

[75] Inventors: Peter Nolting, Buehlertal; Juergen Mangler, Kuppenheim, both of Fed. Rep. of Germany

[73] Assignee: Robert Bosch GmbH, Stuttgart, Fed. Rep. of Germany

[21] Appl. No.: 954,917

[22] Filed: Sep. 30, 1992

Related U.S. Application Data

[63] Continuation-in-part of Ser. No. 710,355, May 31, 1991, abandoned.

[30] Foreign Application Priority Data

Jun. 13, 1990 [DE] Fed. Rep. of Germany ....... 4018903

[51] Int. Cl.$^5$ ............................................. B60S 1/08
[52] U.S. Cl. ................................ 318/444; 318/DIG. 2
[58] Field of Search ............. 318/443, 444, 480, 483, 318/DIG. 2; 15/250.12, 250.17; 364/424.05; 307/9.1, 10.1

[56] References Cited

U.S. PATENT DOCUMENTS

| | | | |
|---|---|---|---|
| 4,527,105 | 7/1985 | Shiraishi | 318/444 |
| 4,733,142 | 3/1988 | Bicknell | 318/283 |
| 4,740,735 | 4/1988 | Hayashi | 318/483 |
| 4,867,561 | 9/1989 | Fujii et al. | 318/483 X |
| 5,023,467 | 6/1991 | Uhl | 307/10.1 |

Primary Examiner—Bentsu Ro
Attorney, Agent, or Firm—Michael J. Striker

[57] ABSTRACT

The method of operating a windshield wiper intermittently requires an apparatus including a rain sensor (12), which generates a signal (S) depending on an amount of rain on the windshield, and a signal processing device (13), e.g.a microprocessor with internal A/D and D/A converters, connected to the sensor (12) to receive the signal (S) and, a control unit connected to the signal processing device (13), and, advantageously, a device for measuring a wiping process duration (T) and inputting the duration to the microprocessor and a drive for the windshield wiper connected to the signal processing device (13). According to the method, the windshield wiper is operated by the signal processing device at least partially according to the signals (S) from the sensor so that the time interval (I) between successive current wiping processes, depends, in part, on a duration $(T_{-1}, T_{-2}, \ldots T_{-n})$ of at least one past wiping process $(W_{-1}, W_{-2}, \ldots W_{-n})$; in part, on a number of signals (S) received from the sensor (12) in a certain time interval F set in the signal processing device; in part, on at least one of two intervals $(I_{-1}, I_{-2}, \ldots I_{-n})$ between past wiping processes (W); and also depends, in part, on at least one time interval $(D_0, D_{-1}, \ldots D_{-n})$ between successive ones of the signals $(S_0, S_{-1}; S_{-1}, S_{-2}, \ldots S_{-n}, S_{-n-1})$.

19 Claims, 5 Drawing Sheets

FIG.2
PRIOR ART
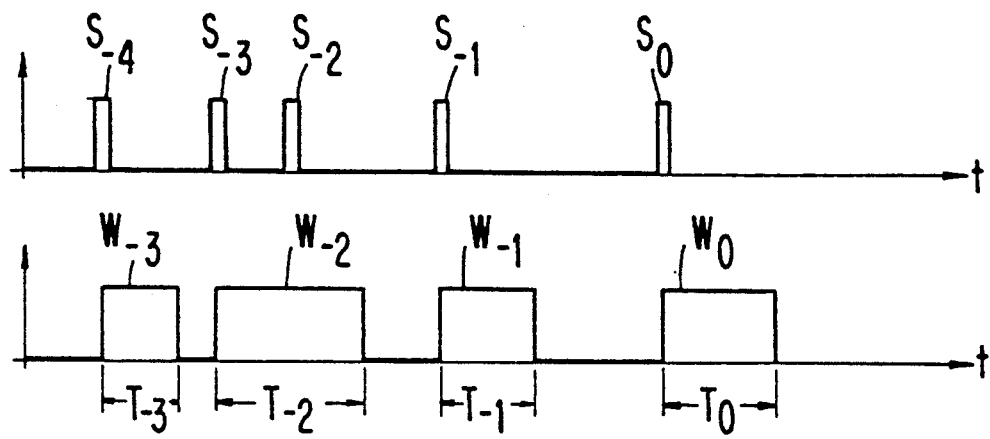
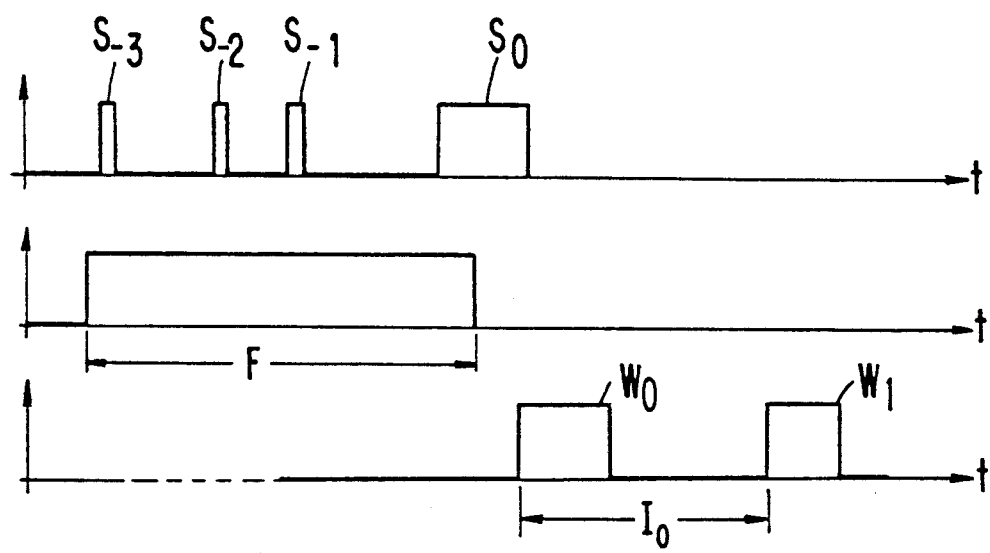
FIG.3

METHOD OF OPERATING A WINDSHIELD WIPER

The present invention relates to a method of operating a windshield wiper intermittently in certain time intervals. This application is a continuation-in-part of application, Ser. No. 710,355, filed May 31, 1991, and now abandoned.

BACKGROUND OF THE INVENTION

A method of operating a windshield wiper of a motor vehicle is described in U.S. Pat. No. 45 42 325. The windshield wiper is controlled by a rain sensor. The dirt, the moisture coating or the precipitation on the window to be cleaned is detected by the rain sensor, which transmits a signal to a control device of the windshield wiper. The sensor, however, observes only a comparatively small portion of the total windshield surface. The windshield wiper operation method set forth in U.S. Pat. No. 45 42 325 having the object of a uniform wiper operation provides a suppression of the integration of the detected signal during windshield wiper operation. With the known method a lower limit for the interval between two washing or wiping events is defined, which cannot be exceeded in intermittent operation.

SUMMARY OF THE INVENTION

It is an object of the invention to provide an improved method for intermittent operation of a windshield wiper under control of a rain sensor.

The method of operating the windshield wiper according to the invention requires an apparatus for operating the windshield wiper comprising at least one rain sensor for detecting a predetermined amount of rain on the windshield(which may of course also sense other materials including dirt and snow), a signal processing device connected to the rain sensor to receive the signals therefrom, a drive connected to the signal processing device to operate the windshield wiper according to the signal processing device and a control unit for the windshield wiper connected to the signal processing device for input of external control signals, i.e. operator control signals. The drive includes a drive motor for the wiper and means for generating and transmitting a signal indicating the duration of at least one of the intermittent wiping processes.

The signal processing device can advantageously be a microprocessor with a random access memory and analog-to-digital and digital-to-analog converters. The rain sensor can include a light emitting diode (LED) and a photodiode to detect the light emitted by the LED.

According to a first feature of the invention, the time interval between successive wiping processes is determined by the rain sensor signals input to the signal processing device, e.g.the microprocessor. The time interval can be determined, for example, by the number of signals from the rain sensor received in a certain time interval or by at least one time interval $(D_0, D_{-1}, \ldots D_{-n})$ between successive past sensor signals $(S_0, S_{-1}; S_{-1}, S_{-2}; \ldots S_{-n}, S_{-n-1})$.

According to another feature of the invention, the time interval between successive current wiping processes, in part, can also depend on a duration $(T_{-1}, T_{-2}, \ldots T_{-n})$ of at least one past wiping process (W-1, W-2...W-n), and, in a further feature of the invention, can also depend on at least one of two intervals $(I_{-1}, I_{-2}, \ldots I_{-n})$ between past wiping processes $(W_{-1}, W_{-2}, \ldots W_{-n})$.

In various embodiments of the invention the time intervals between two successive wiping process are adjusted to the windshield cleaning requirements according to either the signals received from the rain sensor, particularly the number of signals received in a certain time interval and/or time intervals $(D_0, D_{-1}, \ldots D_{-n})$ between past successive signals, and/or the previous course of the wiping processes, as defined by the wiping durations $(T_{-1}, T_{-2}, \ldots T_{-n})$ or weighted time intervals $(I_{-1}, I_{-2}, \ldots I_{-n})$ between successive past wiper processes.

The method according to the invention can provide a smoothing of the variations in the time intervals between successive wiping processes, which avoids large discontinuation or gaps between the individual intervals and provides a uniform windshield wiper action.

The features of the invention are actualized by simple means. The windshield wiper apparatus controlled by a rain sensor contains a circuit for evaluation of the signal delivered from the sensor, which is reinforced or amplified by a signal processing arrangement, which preforms the required signal processing and calculation.

It is particularly advantageous to use the difference between the time intervals between wiping events, their durations and the time between generation of the signal in the sensor to control the windshield wiper operation. The signal analysis can be simplified and possible trends detected more easily using the differences of these values instead of the absolute values.

By weighting certain values of the time intervals between the sensor signals and/or the wiping events certain other analytical advantages can be obtained. The weighting allows, for example, the most recent wiping process to be relied on more heavily than earlier wiping processes in the determination of the wiper control.

Similarly, it is particularly advantageous, when the time interval, in which the current number of control signals generated by the sensor is determined, is varied depending on a learned value, which, for example, is established from the previously determined number of sensor signals.

In another embodiment of our invention, the time interval over which signals are counted or the weighting of values depends on the speed of the motor vehicle in which the windshield wiper is installed. This feature allows an additional adjustment to the varying requirements of window cleaning at different vehicle speeds.

For a pleasant intermittent operation of the windshield wiper it has proven appropriate to provide a lower and/or upper limit for the interval between successive washing processes. Above a certain limit the intermittent operation is shut off, while below a lower limit the windshield wiper is put into continuous operation.

BRIEF DESCRIPTION OF THE DRAWING

The objects, features and advantages of the present invention will now be illustrated in more detail by the following detailed description, reference being made to the accompanying drawing in which:

FIG. 2 is a graphical illustration of the time course of a signal generated by the rain sensor of FIG. 1 and the corresponding wiping process according to the prior art;

FIGS. 3 to 5 are graphical illustrations of the time course of a signal generated by the rain sensor of FIG. 1 and the corresponding wiping process according to various embodiments of the method of the invention.

DETAILED DESCRIPTION OF THE PREFERRED EMBODIMENTS

Figure 1:
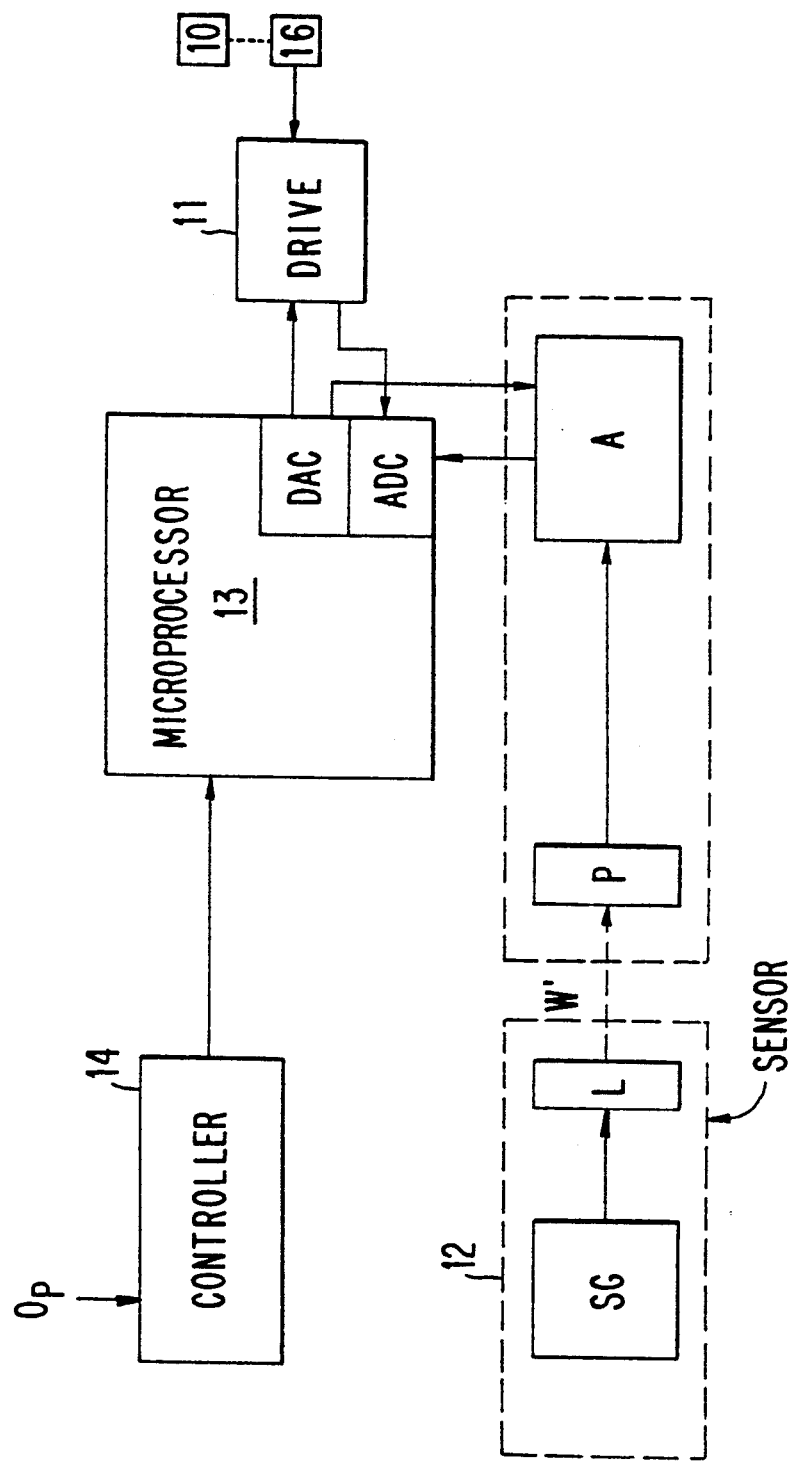
FIG. 1 is a block diagram of an apparatus for operating a windshield wiper according to the method of the invention.

FIG. 1 shows a block diagram of an apparatus for operating a windshield wiper 10 according to the invention, which is mechanically driven by a drive 11 including an unshown drive motor and any required gears or connecting elements. The windshield wiper 10 cleans an only schematically illustrated windshield W'. The material on the windshield surface to be remove, i.e. the rain, dirt or the moisture coating is detected by a sensor 12, which delivers a signal to a microprocessor 13. Remote signals from a control unit 14, which is responsive to unshown operator or drive control mechanisms or devices, are input to the microprocessor 13. The control unit contains unshown elements for operation of the windshield wiper 10. A signal is also fed from the drive 11 to the microprocessor 13, from which the duration of a wiping motion of the windshield wiper 10 is derivable. This signal is for example picked up by a final position switch 16 of the drive 11.

The windshield wiper 10 is, for example, provided for cleaning the surface of a window built into the motor vehicle. Instead of a single windshield wiper 10 shown in FIG. 1 also several windshield wipers can be provided, which are operable by one or more drives 11.

The microprocessor 13 can be any of a large variety of commercially available 8-bit(or larger) microprocessors including analog-to-digital conversion means ADC and digital-to-analog conversion means DAC for input and output of analog signals. For example a SGS Thomson microcontroller Model ST 6210 including an 8 bit ADC, timer, an oscillator, a random access memory as well as two data ports can be used.

The rain sensor 12 can include a light emitting diode L and a photodiode P. A signal generator, e.g. Signetics SA 555, can be used to generator a square wave pulse to drive the LED L to produce a pulsed light emission. The intensity of the light emission is measured by a photodiode P connected to an amplifier and filter A whose output is fed to the ADC of the microprocessor 13. The amplifier A can be a Texas Instruments TLC 274. The photodiode can be any of a number of standard photodiodes used in rain sensors and the photodiode and the light emitting diode L are positioned so that rain on the windshield or falling in the vicinity of the windshield comes between them so that light passing between them is attenuated. A voltage regulator, for example, a Motorola MC 7805 can be part of the controller 14.

FIG. 2 shows in its upper portion the time course of the signals $S_0$, $S_{-1}$, $S_{-2}$, $S_{-3}$, $S_{-4}$ input to the microprocessor 13 by the rain sensor 12. The wiping processes or strokes activated by those signals, which would be produced in a prior art method, are shown in the lower portion of FIG. 2. The duration of the wiping processes are indicated with $T_0, T_{-1}, T_{-2}, T_{-3}$. The wiping process $W_0$, $W_{-1}$, $W_{-2}$, $W_{-3}$ in irregular intervals. The signals $S_{-2}$ and $S_{-3}$ are so close to each other that the intermittent operation of the windshield wiper in response to these two signals is essentially continuous and the wiping process $W_{-2}$ is the sum of two wiping processes, which occur in succession. In FIG. 2 it is clear that the individual wiping processes can have different durations $T_0$, $T_{-1}$, $T_{-2}$, $T_{-3}$.

FIG. 3 shows the wiping process or strokes of one embodiment of a method performed according to our invention with the apparatus shown in FIG. 1. In the microprocessor (signal processing device) 13, a time interval of duration F is provided, in which the signals $S_0$, $S_{-1}$, $S_{-2}$, $S_{-3}$ delivered to the sensor 12 are counted. The result of this counting influences the duration $I_0$ of the predetermined wiper interval, which is between both $W_0$, $W_1$. FIG. 3 shows, that the wiper process, $W_0$, is immediately activated or initiated after the receipt of the signal $S_0$. The signal, $S_0$, delivered by the rain sensor 12, which indicates a certain predetermined amount of rain material on the windshield, is present until the cleaning by the wiping process, $W_0$, ends the activating mode of the signal $S_0$. The duration F of the time interval can be fixed. Advantageously, it is variable. The duration, F, of the time interval is changeable depending, for example, on the vehicle speed of the motor vehicle, in as much as the windshield wiper for the windshield cleaning is built into the motor vehicle. Furthermore, the duration, F, can be readjusted depending on the number of the issuing signals $S_0$, $S_{-1}$, $S_{-2}$, $S_{-3}$.

Figure 4:
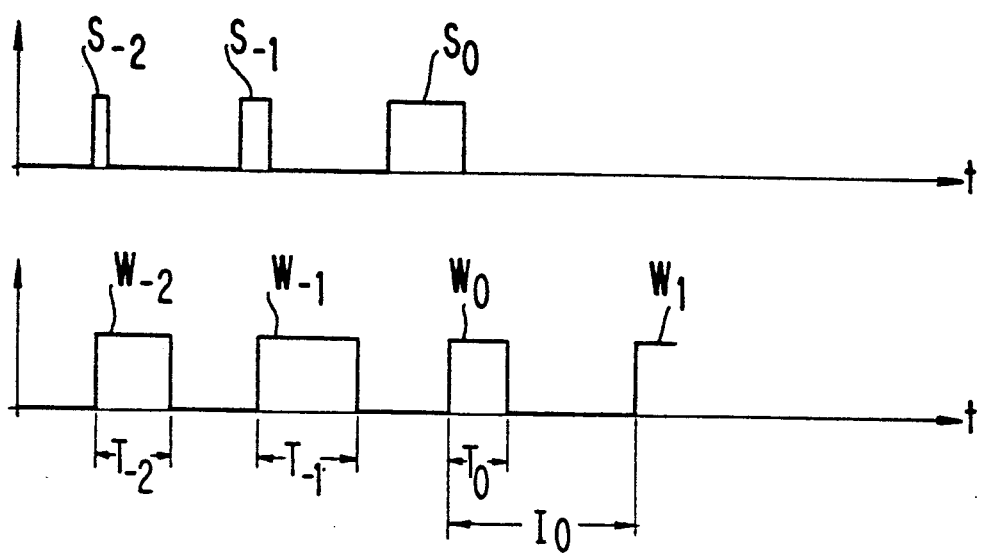

The time course of the signals $S_0$, $S_{-1}$, $S_{-2}$ from the rain sensor 12 and the wiping processes $W_1$, $W_0$, $W_{-1}$, $W_{-2}$ occurring in another embodiment of a method for controlling intermittent operation of a windshield wiper 10 according to the invention are shown in FIG. 4. The wiping events $W_1$, $W_0$, $W_{-1}$, $W_{-2}$ activated by these signals have different durations $T_0$, $T_{-1}$, $T_{-2}$. These different durations $T_0$, $T_{-1}$, $T_{-2}$ depend on the amount of rain on the windshield. The durations of the wiper processes $T_0$, $T_{-1}$, $T_{-2}$ are longer with an increasingly dry window, since the friction increase. According to the invention the determination of at least one of the durations, $T_0$, $T_{-1}$, $T_{-2}$, of the wiping process $W_0$, $W_{-1}$, $W_{-2}$ influences the interval $I_0$ for the next wiping process $W_1$, which follows the wiping process $W_0$. This influence is shown in FIG. 4, since each signal $S_0$, $S_{-1}$, $S_{-2}$ does not directly activate a wiping process $W_1$, $W_0$, $W_{-1}$, $W_{-2}$. The next wiping process $W_1$ occurs, although no corresponding signal S is generated by the sensor 12, because the control program in the microprocessor 13 considers the duration of the past wiper process as well as the number or time interval spacing of signals from the rain sensor 12.

Figure 5:
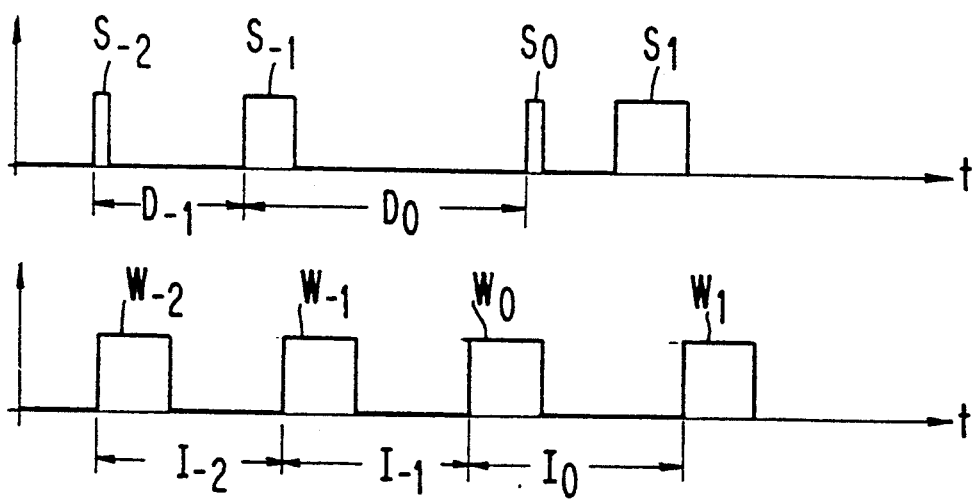

FIG. 5 shows the time course of signals $S_1$, $S_0$, $S_{-1}$, $S_{-2}$ and of the wiping events $W_1$, $W_0$, $W_{-1}$, $W_{-2}$, which occur in another embodiment of the method of the invention. The durations of the wiper processes are indicated with $W_1$, $W_0$, $W_{-1}$, $W_{-2}$. The time interval between the signals $S_{-2}$ and $S_{-1}$ is determined and is $D_{-1}$ and the interval between the signals $S_{-1}$ and $S_0$ is determined and represented by $D_0$. The intervals between the successive wiping processes are indicated with $I_0, I_{-1}, I_{-2}$.

The method according to the invention uses at least a spacing or interval $D_0$ and/or $D_{-1}$ between the signals $S_0, S_{-1}$ and $S_{-2}, S_{-1}$ for influencing, at least partially, a following wiping interval $I_0$. In another embodiment of the method according to our invention the time intervals $I_{-1}$ and/or $I_{-2}$ between wiping processes can also influence the current time interval $I_0$. In both of these embodiments weighting factors can be used to provide more weight to the immediate past time interval between signals or the immediate past time interval between the wiping processes. In this way a smooth transition in wiping processes interval can be obtained even if the rain suddenly stops.

In the microprocessor 13 the processing of the absolute values of the various parameters including wiping process durations, time intervals between sensor signals and the like is simplified, when differences are formed from successive parameter values. The differences $T_0-T_{-1}$, $T_{-1}-T_{-2}$ and the like of the wiping processes durations or the differences $D_0-D_{-1}$, $D_{-1}-D_{-2}$ and the like between time intervals between successive signals (S) are also useful in processing.

An especially advantageous embodiment of the method according to the invention provides a weighting of the measured parameters and/or the calculated parameter differences. In this weighting performed in microprocessor 13 a higher value can be provided for recent events in contrast to events in the recent past. The detected durations of the wiping processes $T_0$, $T_{-1}$, $T_{-2}$ or the time intervals $D_0, D_{-1}$ between successive rain sensor signals $S_0, S_{-1}, S_{-2}$ or the time intervals $I_{-1}, I_{-2}, \ldots$ between the wiping processes $W_{-1}$ and $W_{-2}$; between $W_{-2}$ and $W_{-3}$ and so forth can be weighted with appropriate predetermined weighting factors input to the signal processing device (13). The weighting can of course be chosen by experience or according to other variables including vehicle speed. An increased vehicle speed leads to more frequent activation of the wiping process W.

An additional embodiment of the invention provides a predetermined minimum and/or maximum Interval I. The intermittent operation of the windshield wiper 10 is advantageously changed over to continuous operation below the lower limit. Above the upper limit the intermittent operation is advantageously switched off.

The apparatuses according to the invention are started in a first initial period of windshield wiper action after a comparatively long pause with the aid of a suitable method, so that an evaluation of the subsequent intervals I can occur. A suitable starting method provides for example for activation of a wiper process W immediately after occurrence of a signal S delivered by the sensor 12.

The apparatus according to the invention are further structured so that suddenly occurring water jets during the intermittent operation lead to abandonment of the intermittent operation method and to activation of a timed duration operation when a predetermined threshold for the signal delivered from the sensor is exceeded.

Although the signal processing device can be structured as an analog device, a digital signal processing device, in which the signal processing is advantageously performed in a computer, is described here.

EXAMPLE

Figure 6A:
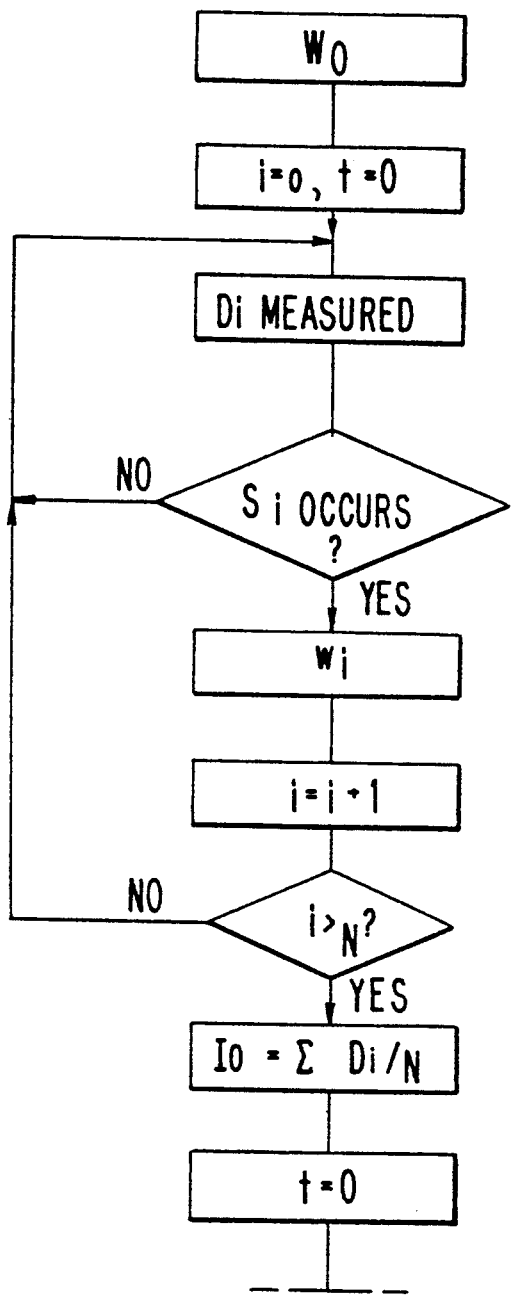
FIGS. 6a and 6b show a flow chart for a program used by the microprocessor in FIG. 1 to perform a preferred embodiment of the method according to the invention, FIG. 6a showing a program segment for a direct activation operating mode and FIG. 6b showing a program segment for an intermittent operating mode according to the invention.
Figure 6B:
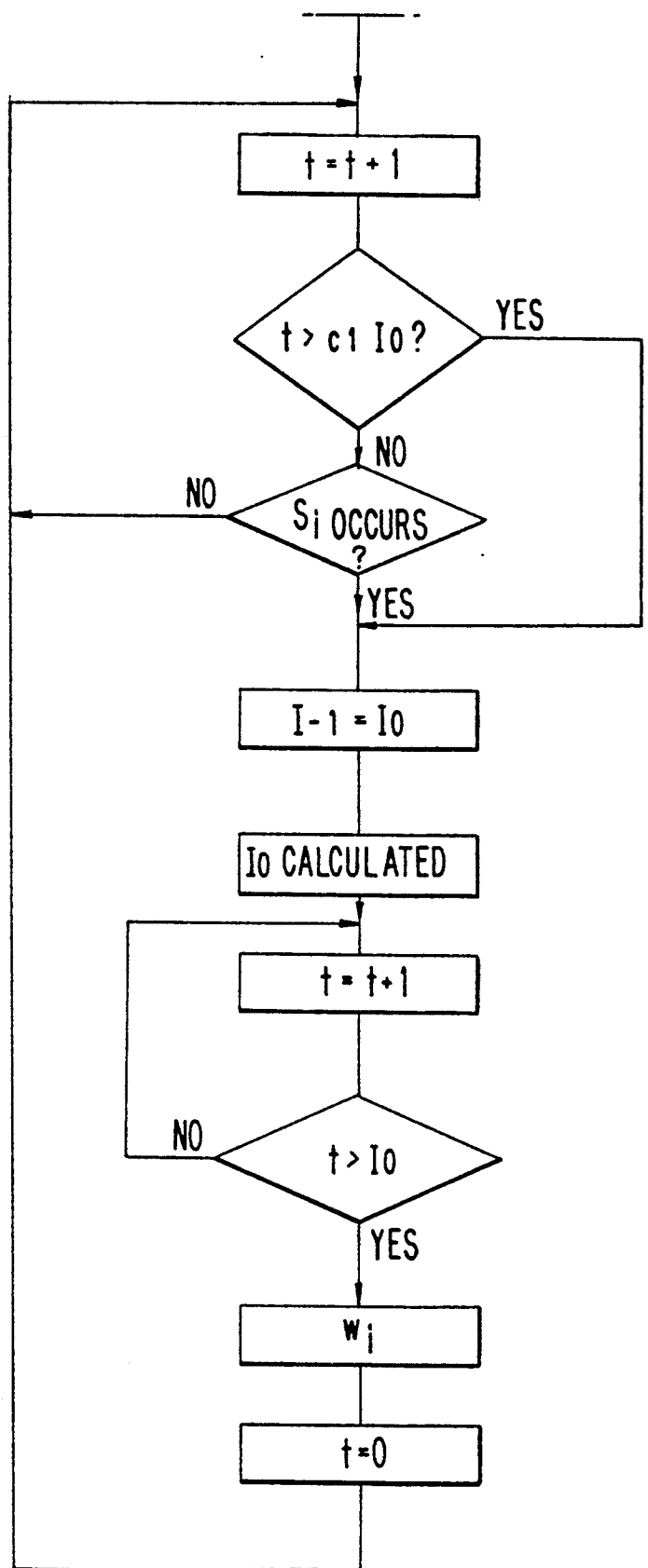

A flow chart of an exemplary embodiment of the method of the invention is shown in FIGS. 6a and 6b. This flow chart and the exemplary method, which are useful for construction of a program for the microprocessor 13 and are illustrative of the claim method are described in detail hereinbelow.

The program is necessarily broken up into an initial so-called direct activation operation mode shown on FIG. 6a and an intermittent operation mode shown on FIG. 6b due initializations and other complications required by the detailed computations.

The rain sensor 12 is activated(voltage turned on), when a wiping process is initiated via the controller 14. That wiping process is indicated in the first block on FIG. 6a with $W_0$. The zeroth wiping process, $W_0$, has two results, first the windshield is cleaned and second the microprocessor, the rain sensor 12 and the other devices for performing the method are activated.

Next, all variables(i,t) are initialized in the RAM memory in the microprocessor 13.

Initially the direct activation operation mode is selected. In this operation mode a wiping process occurs immediately at the beginning of each signal from the rain sensor 12. Initially the $D_i$ values are obtained directly as the time interval between a wiping process and the following signal interrupt from the rain sensor 12(See FIG. 6a).

This process occurs for a predetermined number N of wiping processes. When N wiping processes have occurred(second decision block in FIG. 6a), the mode of operation is switched from the direct activation operation mode to the intermittent operation mode according to the invention and control eventually passes to the program illustrated by the flow chart in FIG. 6b.

To calculate the first time interval in intermittent operation the sum of the "$D_i$" obtained during direct activation are divided by the number N of the wiping processes in the direct activation mode. This is similar to the method claimed in claim 6, but involves a simple averaging over all "$D_i$" during the direct activation mode.

Then the clock or time counter is set to zero (t=0) (FIG. 6a) and the rain sensor 12 begins the intermittent operation mode.

In this operation mode the following times are continuously measured and actualized: the actual clock time, t; the wiping process durations, T; and the $D_i$ time intervals from a wiping process to the next $S_i$ are measured.

In the program section, in which the time to the next $S_i$ is measured, a comparison between the actual counter time t and the product of the constant $c_1$ and the actual interval time $I_0$ occurs. If the actual counter time t is larger than this product, the actual counter time is stored and an $S_i$ value is no longer expected.

The actual interval time $I_0$ is placed in a program loop, which means that a new calculated value always replaces the old or previous value value and the desired number of past I values is always available. Further the previous $I_0$ value is designated as the value $I_{-1}$ when a signal $S_i$ is generated by the rain sensor 12(see the first decision block in FIG. 6b and the following block).

The next step is to calculate actual new interval time $I_0$ after the newly occurred signal from the rain sensor. This is accomplished by the following equation, which is not shown on the flow chart:

$$I_o = C_2(a_0D_0 + a_1D_{-1} + \ldots + a_nD_{-n})/\Sigma a_i + C_3(b_1I_{-1} + b_2I_{-2} + \ldots + b_nI_{-n})/\Sigma b_i + C_4\{I_{-1}\Sigma K_iT_{-1}/(k_2T_{-2} + k_3T_{-3} + \ldots + k_nT_nT_{-n}\}$$

In the above equation the variables are defined as follows: I=the interval between wiping processes; W=duration of the wiping process; t=actual time; D=the time interval between sensor signals; and i is the ith wiping process.

The constants $a_i$, $b_i$ and $k_i$ are weighting factors for the ith values of the D, I and T variables. Their values and the maximum number of terms in the series m and n are a matter of choice and are selected in a predetermined way according to experience to guarantee a smooth operation. The same is true of the values $C_2$, $C_3$ and $C_4$, which weight the relative importance of past D values, past I values and past wiper durations T in the calculation of the current $I_0$.

Ranges of these constants are as follows: $C_2$, $C_3$ and $C_4$ can take values from 0 to 1 and $C_1$ can take values from 1 to 10, while $C_2 + C_3 + C_4$ must always be 1. The ratios $k_0/k_n$; $b_0/b_n$; $a_0/a_n$ can take on values from 10:1 to 100:1. The ratios $k_{n1}/k_{n2}$; $b_{n1}/b_{n2}$; $a_{n1}/a_{n2}$ can take on values from 1:1 to 10:1.

The program segment described above continues until the actual time t exceeds the calculated time interval $I_0$. After that the program exits from this program segment, the wiper process occurs and its time duration T is measured. Then the counter for the time or the clock is initialized to t=0 and the program returns to the interrupt segment in which it waits for the next signal interrupt.

It will be understood that each of the elements described above, or two or more together, may also find a useful application in other types of constructions differing from the types described above.

While the invention has been illustrated and described as embodied in a apparatus and method for operating a windshield wiper, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. Method of operating a windshield wiper intermittently to clean a windshield using an apparatus including at least one sensor (12), a signal processing device (13) connected to said sensor so as to receive signals therefrom and a control unit for said windshield wiper connected to said signal processing device (13), comprising the steps of:

a. generating in said sensor a plurality of signals (S) with time intervals (D) between successive signals for controlling the windshield wiper (10) according to an amount of rain on the windshield, b. inputting to said signal processing device (13) predetermined weighting factors for the time intervals $(I_{-1}, I_{-2}, \ldots I_n)$ between successive past wiping processes; and c. operating the windshield wiper (10) with said signal processing device at least partially according to said signals (S) to provide a plurality of wiping processes (W) so that the time interval (I) between successive current wiping processes depends, at least partly, on at least one of the time intervals $(I_{-1}, I_{-2}, \ldots I_{-n})$ between past wiping processes $(W_{-1}, W_{-2}, \ldots W_{-n})$ and at least one of the predetermined weighting factors.

2. Method according to claim 1, further comprising the step of forming weighted differences between past time intervals $(I_{-1}, I_{-2}, \ldots I_{-n})$ with said signal processing device (13) according to the weighting factors.

3. Method according to claim 1, further comprising the step of setting a lower limit for each of the time intervals (I) between successive wiping processes.

4. Method according to claim 1, further comprising the step of setting an upper limit for each of the time intervals (I) between successive wiping processes.

5. Method as defined in claim 1, wherein the operating is such that the time interval (I) between successive current ones of the wiping processes also depends on a duration $(T_{-1}, T_{-2}, \ldots, T_{-n})$ of at least one past wiping process $(W_{-1}, W_{-2}, \ldots, W_{-n})$.

6. Method of operating a windshield wiper intermittently to clean a windshield using an apparatus including at least one sensor (12), a signal processing device (13) connected to said sensor so as to receive signals therefrom and a control unit for said windshield wiper connected to said signal processing device (13), comprising the steps of:

a. generating in said sensor a plurality of signals (S) for controlling the windshield wiper (10) according to an amount of rain on the windshield;

b. inputting to said signal processing device (13) predetermined weighting factors for the time intervals $(D_0, D_1, \ldots D_{-n})$ between successive signals (S); and c. operating the windshield wiper (10) with said signal processing device at least partially according to said signals (S) to provide a plurality of wiping processes (W) so that a time interval (I) between successive current wiping processes depends, at least in part, on at least one time interval $(D_0, D_{-1}, \ldots D_{-n})$ between successive ones of said signals $(S_0, S_{-1}; S_{-1}, S_{-2}; \ldots S_{-n+1}, S_{-n})$ and at least one predetermined weighting factor.

7. Method according to claim 6, further comprising the step of forming weighted differences between time intervals $(D_0, D_{-1}, D_{-2}, \ldots D_{-n})$ between successive past signals $(S_0, S_{-1}; S_{-1}, S_{-2}; \ldots S_{-n+1}, S_{-n})$ with said signal processing device using the weighting factors.

8. Method as defined in claim 6, wherein the operating is such that the time interval (I) between successive current ones of the wiping processes also depends on a duration $(T_{-1}, T_{-2}, \ldots T_{-n})$ of at least one past wiping process $(W_{-1}, W_{-2}, \ldots, W_{-n})$.

9. Method according to claim 6, further comprising the step of setting a lower limit for each of the time intervals (I) between successive wiping processes.

10. Method according to claim 6, further comprising the step of setting an upper limit for each of the time intervals (I) between successive wiping processes.

11. Method of operating a windshield wiper intermittently to clean a windshield using an apparatus including at least one sensor (12), a signal processing device (13) connected to said sensor so as to receive signals therefrom and a control unit for said windshield wiper connected to said signal processing device (13), comprising the steps of:
  a. generating in said sensor a plurality of signals (S) for controlling the windshield wiper (10) depending on an amount of rain on the windshield, and
  b. operating the windshield wiper (10) with said signal processing device at least partially according to said signals (S) to provide a plurality of wiping processes (W) so that a time interval (I) between successive current ones of the wiping processes, in part, depends on a duration $(T_{-1}, T_{-2}, \ldots, T_{-n})$ of at least one past wiping process $(W_{-1}, W_{-2}, \ldots W_{-n})$, and, in part, depends on a number of signals (S) received from the sensor (12) in a certain time interval, and in part, depends on at least one of two intervals $(I_{-1}, I_{-2}, \ldots, I_{-n})$ between past wiping processes $(W_{-1}, W_{-2}, \ldots, W_{-n})$ and, in part, depends on at least one time interval $(D_0, D_{-1}, \ldots D_{-n})$ between successive ones of said signals $(S_0, S_{-1}; S_{-1}, S_{-2}; \ldots S_{-n+1}, S_{-n})$ 12. Method according to claim 11, wherein the apparatus for operating the windshield wiper intermittently also includes a drive (11) for said windshield wiper (10), said drive (11) and said control unit (14) being connected to the signal processing device (13); and wherein the windshield wiper (10), the drive (11), the signal processing device (13) and the sensor (12) and the control unit (14) are located in a motor vehicle; and further comprising the step of determining the time intervals (I) at least partially according to a vehicle speed of the motor vehicle.

13. Method according to claim 11, further comprising the step of forming differences $(T_{-1}-T_{-2}; T_{-n}-T_{-n-1})$ between durations $(T_{-1}, \ldots T_{-n})$ of successive past wiping processes $(W_{-1}, W_{-2} \ldots W_{-n})$ with said signal processing device.

14. Method according to claim 11, further comprising the step of inputting to said signal processing device (13) weighting factors for durations $(T_{-1}, T_{-2}, \ldots T_{-n})$ of successive past wiping processes and forming weighted differences between the durations of successive past wiping processes $(W_{-1}, W_{-2} \ldots W_{-n})$.

15. Method according to claim 11, further comprising the step of setting a lower limit for each of the time intervals (I) between successive wiping processes.

16. Method according to claim 11, further comprising the step of setting an upper limit for each of the time intervals (I) between successive wiping processes.

17. Method of operating a windshield wiper intermittently to provide an intermittent operation of said windshield wiper consisting of a plurality of successive wiping processes $(W_{-3}, W_{-2}, W_{-1}, W_{-0}$, having durations $(T_{-3}, T_{-2}, T_{-1}, T_0, \ldots)$ with time intervals $(I_{-3}, I_{-2}, I_{-1}, I_0, \ldots)$ between said successive wiping processes using an apparatus including at least one rain sensor (12) for detecting a predetermined amount of rain on the windshield, a signal processing device (13) connected to said rain sensor (12) so as to receive signals (S) therefrom, a drive (11) connected to said signal processing device (13) to operate said windshield wiper, a control unit for said windshield wiper connected to said signal processing device (13) and means for determining the durations of the wiping processes located in said drive and means for transmitting said durations of said wiper processes to said signal processing device, comprising the steps of:
  a) generating in said sensor a plurality of successive signals $(S_{-3}, S_{-2}, S_{-1}, S_0, \ldots)$ for controlling said windshield wiper (10) according to the amount of rain on the windshield;
  b) transmitting said signals to said signal processing device after said generating of each of said signals;
  c) for each of said wiping processes, counting past ones of said signals over a predetermined time interval (F) for each of said wiping processes in said signal processing device (13) to form a sum;
  d) controlling said drive of said windshield wiper with said control unit via said signal processing device so that said time interval between successive current ones of said wiping processes at least partially depends on said sum of said signals counted in said time interval (F); and
  e) determining the time intervals $(D_{-3}, D_{-2}, D_{-1}, D_0 \ldots)$ between successive ones of said signals in said signal processing device (13), and controlling said drive of said windshield wiper with said control unit via said signal processing device (13) at least partially according to said signal (S) so that the time interval between successive current ones of the wiping processes, in part, depends on a duration $(T_{-1}, T_{-2})$ of at least one past wiping process $(W_{-1}, W_{-2})$, and, in part, depends on the sum of the signals (S) determined by the signal processing unit (13), and in part, depends on at least one of two of the time intervals $(I_{-1}, I_{-2})$ between successive past wiping processes (W) and, in part, depends on at least one of the time intervals $(D_0, D_{-1})$ between successive past ones of said signals $(S_0, S_{-1}; S_{-1}, S_{-2})$ 18. Method as defined in claim 17, wherein said means for determining the durations of the wiper processes is a final position switch.

19. Method of operating a windshield wiper intermittently to clean a windshield using an apparatus including at least one sensor (12), a signal processing device (13) connected to said sensor so as to receive signals therefrom and a control unit for said windshield wiper connected to said signal processing device (13), comprising the steps of:
  a. generating in said sensor a plurality of signals (S) with time intervals (D) between successive signals for controlling the windshield wiper (10) according to an amount of a member selected from the group consisting of dirt, a moisture coating, rain and combinations thereof on the windshield,
  b. operating the windshield wiper (10) with said signal processing device at least partially according to said signal (S) to provide a plurality of wiping processes (W) having a time interval (I) between successive wiping processes (W), such that the time interval (I) between successive current wiping processes depends on a number of past signals (S) generated by the sensor (12) in a predetermined time interval,
  c. determining an additional time interval (F) in said signal processing device (13), the additional time interval (F) being changeable depending on the number of signals $(S_0, S_{-1}, S_{-2}, S_{-3}, S_{-4})$ occurring during the additional time interval (F), said additional time interval (F) being said other predetermined time interval.

* * * * *